Aug. 16, 1927.

S. W. VARNADO

SPREADER

Filed April 30, 1926

Inventor
S. W. Varnado

By
Lacey & Lacey, Attorneys

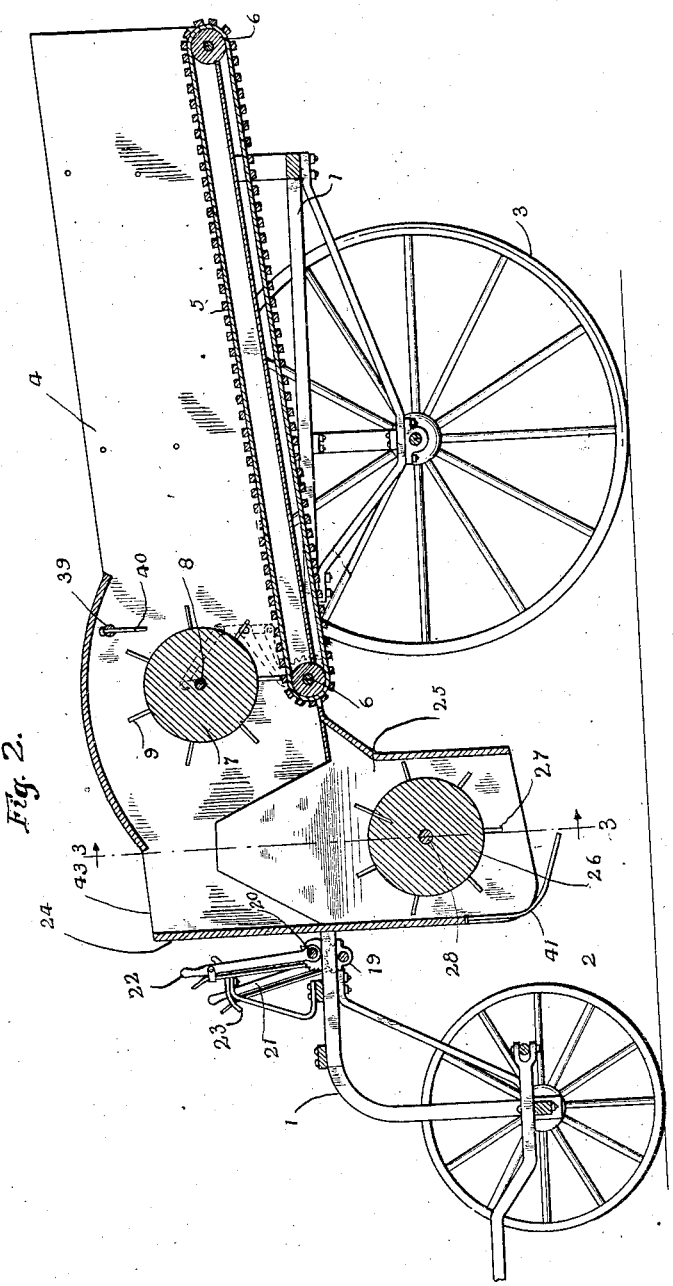

Aug. 16, 1927.　　　S. W. VARNADO　　　1,639,203
SPREADER
Filed April 30, 1926　　　3 Sheets-Sheet 3
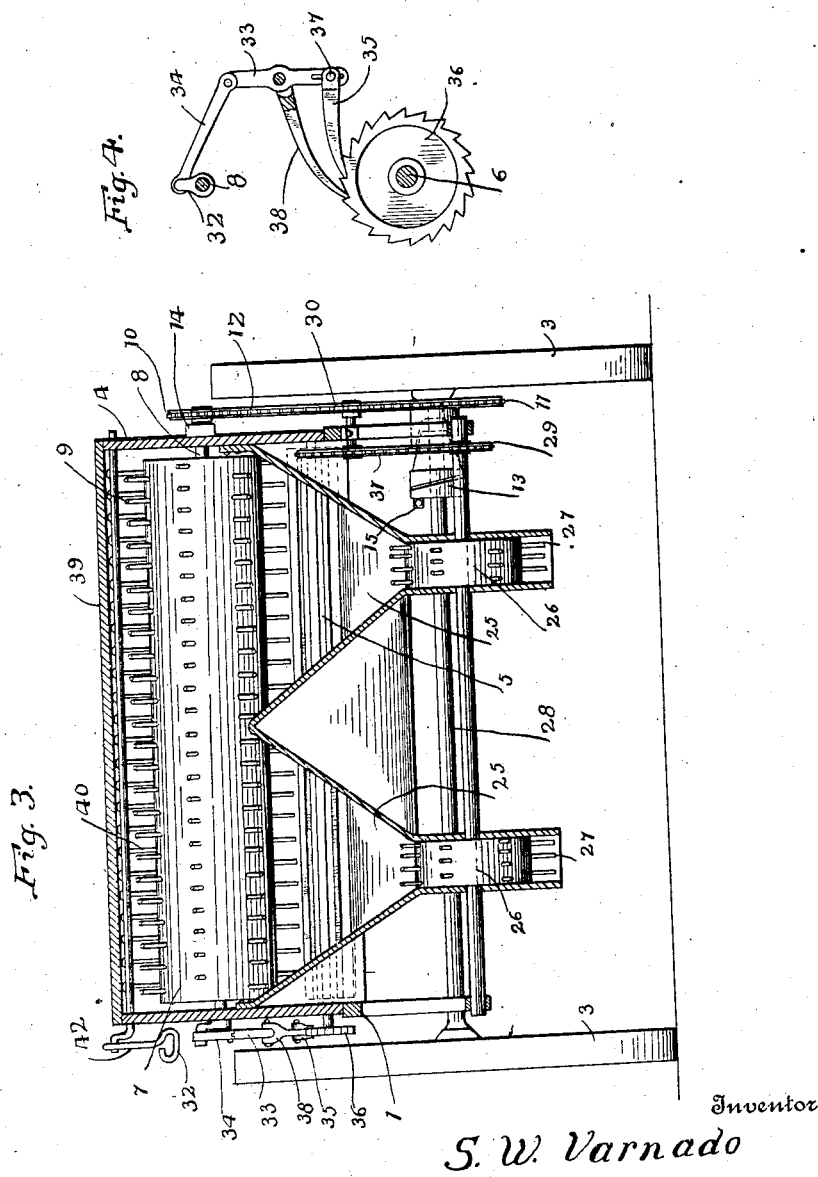
Inventor
S. W. Varnado
By Lacey & Lacey, Attorneys Patented Aug. 16, 1927.

1,639,203

UNITED STATES PATENT OFFICE.

SAMUEL W. VARNADO, OF BATON ROUGE, LOUISIANA.

SPREADER.

Application filed April 30, 1926. Serial No. 105,794.

This invention relates to agricultural machines and has for its primary object the provision of a compact, inexpensive and efficient machine whereby straw or other material may be spread over strawberry beds to form a mulch for the same. The invention seeks to provide a spreading and distributing machine having means whereby a load of material may be fed to distributing and spreading elements and delivered to the ground in a shredded condition as the machine is drawn over the field. The invention is illustrated in the accompanying drawings and will be hereinafter fully set forth.

In the drawings:

Fig. 2 is a vertical longitudinal section through one of the distributing hoppers;

Fig. 3 is a transverse section on the line 2—2 of Fig. 2;

Fig. 4 is a detail.

Figure 1:
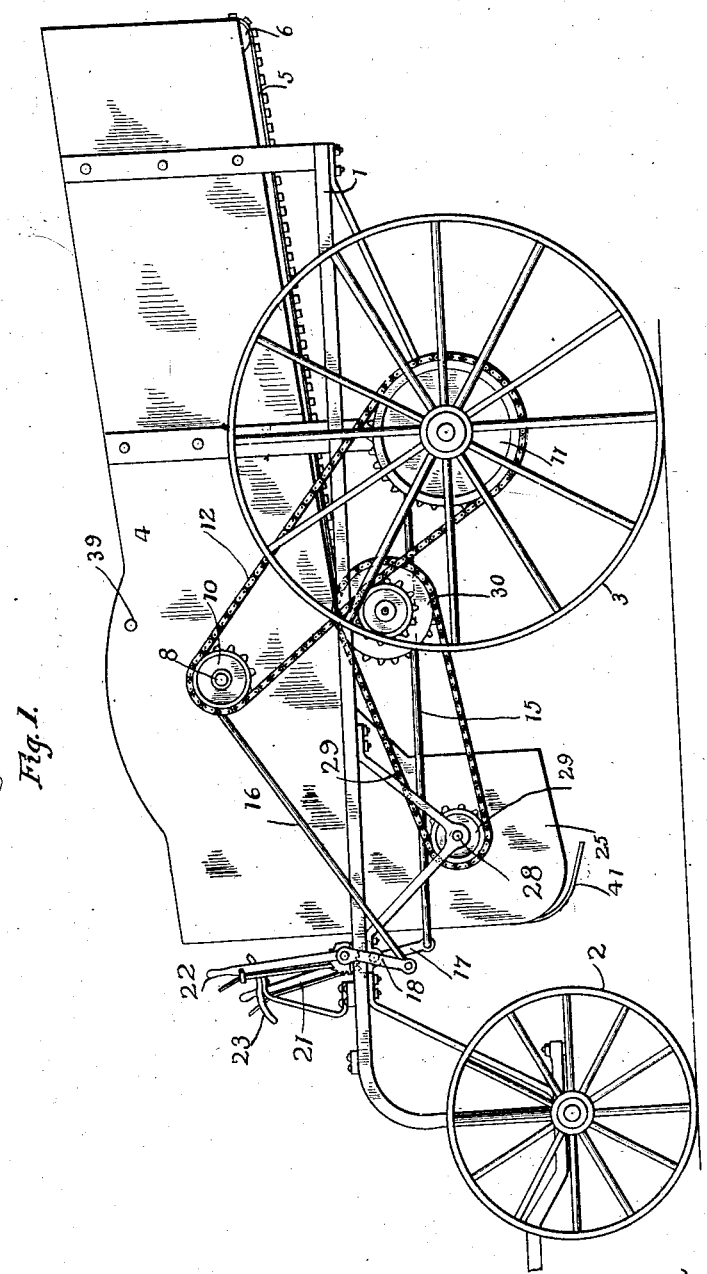
Figure 1 is a side elevation of a spreader embodying my invention.

The machine comprises a main frame 1 of any suitable approved construction mounted upon wheels 2 and 3 whereby it may travel easily over the ground, the wheels 2 being mounted for shifting angular movement whereby the machine may be steered. Mounted on the main frame 1 is a box or body 4, the bottom of which is an endless conveyer 5 consisting of parallel chains and cross slats secured to and carried by the chains in a well-known manner. This conveyer is carried by drums or rollers 6 disposed at the rear end of the body and at the proper point in front of the rear end, these rollers being so relatively located that the belt is inclined downwardly and forwardly, as clearly shown in Fig. 2. Mounted in the sides of the body 4 above the front roller, 6 is a feeding drum 7 which is carried by a shaft 8 having its ends projected through the sides of the box, the said feeding drum consisting of a substantially cylindrical body having pins or fingers 9 projecting radially from its circumferential surface in such number as to substantially cover said surface. The drum and the pins should be so proportioned that the ends of the pins will be brought close to the conveyer in the operation of the machine. Fitted loosely upon one end of the shaft 8 is a sprocket 10 around which and a sprocket wheel 11 is trained a chain 12, the sprocket wheel 11 being mounted loosely upon the rear axle which carries the wheels 3. To utilize the rotation of the rear axle in order to drive the working mechanism, a clutch, which may be of any well-known form and is indicated conventionally at 13 in Fig. 3, is provided immediately adjacent the sprocket 11 whereby, when the clutch is open, the axle will rotate freely in the hub of the sprocket and when the clutch is closed the sprocket will be locked to the axle so that it will rotate therewith. Obviously the rotation of the sprocket 11 will be transmitted through the chain 12 to the sprocket 10 and in order that the feed roller may be rotated as desired a clutch, indicated at 14, is provided to lock the sprocket 10 at will to the shaft 8 of the feeder drum. The clutches are controlled, respectively, by rods 15 and 16 extending from the setting member of the respective clutches to crank arms 17 and 18 at the outer ends of rock shafts 19, 20 mounted upon the main frame adjacent the front end thereof and controlled by levers 21, 22 arranged adjacent the driver's seat 23. The front end of the body 4 is closed by a wall 24 which serves as a guard and deflector to prevent the material being thrown upon the driver and to direct the material into the distributing hoppers 25 which are constructed at the front end of the body and provided with downwardly converging walls, as shown clearly in Fig. 3, and located immediately adjacent the forward bight of the conveyer 5 and below the feeding drum. The material carried forwardly by the conveyer will be taken up by the feeding drum and carried upwardly, forwardly and over to be deposited in the hoppers 25 in an obvious manner. The said hoppers are open at their lower ends and on their front sides, as shown clearly in Fig. 2, and between the side walls of these hoppers are provided spreading drums 26 which consist of circular or cylindrical bodies equipped with radial pins 27, similar to the feeding drum and clearly shown in Figs. 2 and 3. The spreading drums are carried by a single shaft 28 which extends through the side walls of the hoppers and is equipped at one end with a sprocket 29. Between the sprocket 29 and the main driving sprocket wheel 11, a double idler sprocket 30 is mounted upon the side of the main frame, the lower run of the chain 12 engaging the smaller member of this sprocket, while a chain 31 is trained about the sprocket 29 and the larger member of the double sprocket 30. By this arrangement of gearing, the feeding drum is caused to rotate in the same direction as the ground wheels and the main driving sprocket 11 while the distributing drums will rotate in the opposite direction.

Upon the end of the feeding drum shaft 8 opposite the end carrying the sprocket 10 is a crank 32, and pivotally mounted between its ends upon the side of the body at the rear of the said shaft and crank is a rocking arm or lever 33, the upper end of this rocking arm being connected by a pitman 34 with the crank 32. A pawl 35 is pivoted to and carried by the lower end of the rocking arm 33 and the free end of this dog rides upon and engages a ratchet wheel 36 which is secured upon the adjacent end of the shaft for the front conveyer drum 6. As the shaft 8 rotates, the crank 32 will, of course, be likewise rotated and will impart a rocking movement to the arm 33. As the lower end of the arm 33 swings rearwardly, the pawl or dog 35 will ride over the ratchet wheel 36 without imparting motion thereto but upon the reverse movement of the rocking arm the dog will ride against the abrupt face of a ratchet tooth so that the motion of the dog will be imparted to the ratchet and transmitted through the same to the conveyer drum and the conveyer. The conveyer is thus actuated step by step to carry the material to the feeding drum and the speed of the feeding may be regulated in any convenient manner as, for instance, by shifting the pivot 37 of the dog longitudinally of the rocking arm 33. A pawl 38 is hung on the pivot of the rocking arm and extends over to the ratchet to engage the same and prevent back motion thereof.

Above and to the rear of the feeding drum is a guard consisting of a rod 39, journaled in the sides of the box, and pendent fingers 40 carried thereby in position to intercept portions of the material taken up by the feeding drum whereby the material will be shredded and will be prevented from passing in excessive quantities. At the lower ends and front sides of the distributing hoppers are spreader fingers 41 which extend downwardly and rearwardly to check the discharged material so that it will spread evenly over the plant beds. The guard fingers 40 may be set at any desired angle by a handle member 42, and the top of the box is open at its front end, as shown at 43, to permit the driver to observe the operation and obtain access to the distributing hoppers when necessary.

The material to be spread is loaded into the wagon body to rest upon the conveyer 5. The machine is then drawn to the field upon which it is to operate, the clutches being open. Upon reaching the point where the spreading operation is to begin, the clutches are closed so that, if the machine be then drawn forward over the field, the feeding drum and the distributing drums will be rotated and the conveyer will be actuated step by step to carry the material to the feeding drum. The rotation of the feeding drum carries the pins thereon upwardly through the material, some of which will be caught by the pins and carried over to and deposited in the distributing hoppers. The material will fall through the hoppers onto the spreading drums and will be engaged by the same so that it will be carried downwardly at the rear and then thrown outwardly so that it will spread and will drop onto the ground to cover a relatively wide area. Should the material be found to feed to the spreading or distributing hoppers faster than it can be handled by the spreading drums, the feeding drum may be temporarily stopped by opening the clutch upon the feeder drum shaft in an obvious manner.

From the foregoing description, taken in connection with the accompanying drawings, it will be seen that I have provided a very simple and compact machine whereby material will be fed forwardly within a vehicle and delivered at the front end thereof to be spread over the ground rapidly and evenly.

Having thus described the invention, I claim:

1. A machine for the purpose set forth comprising a vehicle body having a guard wall closing its front end, a cover secured upon the body adjacent and spaced from the guard wall, a conveyer mounted in the body and providing a bottom therefor, a feeding drum arranged within the body under the cover and over the front end of the conveyer, a pair of hoppers depending from the front end of the body in juxtaposition to the guard wall, said hoppers having open bottoms and having walls which are vertical in their lower portions and flared in their upper portions, the upper flared portions of the walls terminating at the conveyer, the sides of the body and the medial longitudinal line of the body respectively, spreader drums mounted in and fitting closely between the vertical portions of the walls of the respective hoppers, means for rotating the feeder drum and spreader drums in opposite directions, and means for simultaneously actuating the conveyer to carry material to and under the feeding drum and deliver it into the hoppers.

2. A machine for the purpose set forth comprising a vehicle, a conveyer constituting the bottom of the vehicle, a feeding drum arranged within the vehicle over the front end of the conveyer, distributing hoppers carried by the vehicle in position to receive material from the feeding drum, spreader drums mounted in the lower ends of the said hoppers, and spreader fingers extending downwardly and rearwardly from the front sides of the distributing hoppers at the lower ends thereof.

In testimony whereof I affix my signature.

SAMUEL W. VARNADO. [L. S.]